United States Patent [19]

Hanma et al.

[11] 4,320,417
[45] Mar. 16, 1982

[54] AUTOMATIC FOCUSING SYSTEM FOR VIDEO CAMERA

[75] Inventors: Kentaro Hanma, Yokohama; Kaoru Yanagawa, Katsuta, both of Japan

[73] Assignee: Hitachi, Ltd., Tokyo, Japan

[21] Appl. No.: 193,455

[22] Filed: Oct. 3, 1980

[30] Foreign Application Priority Data

Oct. 3, 1979 [JP] Japan .................................. 54-126850

[51] Int. Cl.³ .............................................. H04N 3/26
[52] U.S. Cl. .................................... 358/227; 358/225; 354/195
[58] Field of Search ............... 358/209, 225, 210, 227; 350/41-44; 352/139-140; 354/25, 195; 355/56

[56] References Cited

U.S. PATENT DOCUMENTS

| 3,967,056 | 6/1976 | Yata | 358/227 |
| 4,152,061 | 5/1979 | Gordon | 354/195 |
| 4,161,756 | 7/1979 | Thomas | 358/227 |

FOREIGN PATENT DOCUMENTS 2706238 2/1978 Fed. Rep. of Germany ...... 358/227

*Primary Examiner*—Michael A. Masinick
*Attorney, Agent, or Firm*—Craig and Antonelli

[57] ABSTRACT

This invention relates to automatic focusing systems for video cameras and, more particularly, to an automatic focusing system, which is adopted to effect a focusing operation such as to render maximum the output of a detector detecting a high frequency component of a video signal.

5 Claims, 4 Drawing Figures

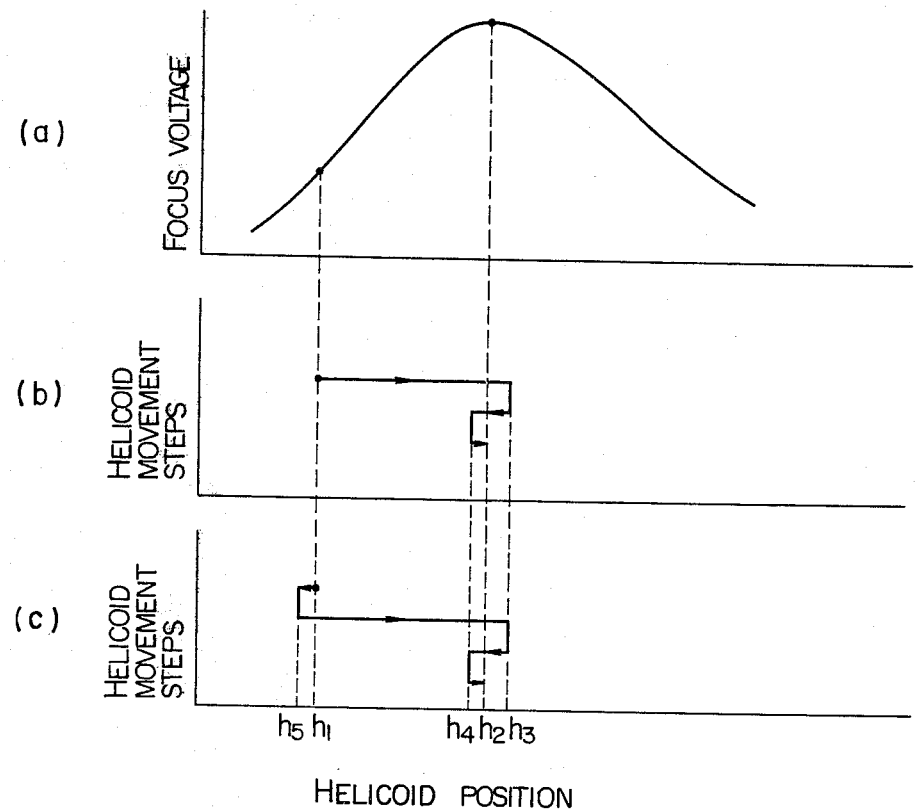

AUTOMATIC FOCUSING SYSTEM FOR VIDEO CAMERA

DESCRIPTION OF THE PRIOR ART

Automatic focusing systems for video cameras of this kind are disclosed in Japanese Pat. No. 5265/64 entitled "Automatic Focusing System for Television Camera" and also in NHK Technical Research Report, 1965, Vol. 17, No. 1, p. 21 under the title of "Automatic Focusing System for Television Camera Based upon Climbing Servo System". These prior art disclosures teach techniques of passing the video signal from a video camera through a high-pass filter to obtain a high frequency component, sampling a voltage proportional to the fineness or extent of freedom from confusion of the television image (hereinafter referred to as focus voltage) by detecting the extracted high frequency component and bringing a focusing ring (hereinafter referred to as helicoid) to a position, at which the focus voltage is maximum, i.e., a position of focus, by taking the difference between two consequtive sampled values and controlling the rotation of the helicoid by a reversible motor such that the difference is always positive.

These systems, however, have the following drawbacks.

The first drawback is that with a zoom lens system based upon an objective lens moving system extensively used for ordinary video cameras and having a focusing mechanism the movement of the helicoid position that is caused for the purpose of focusing results in a slight change of the focal distance of the lens system itself together with the movement of the objective lens.

Since in the above focusing systems the helicoid is moved to the position corresponding to the maximum focus voltage by feeding back the increase or decrease of the sampled value of the focus voltage, even during the focusing operation the helicoid is continuously oscillated back and forth about the position corresponding to the maximum focus voltage. This oscillation causes changes of the focal distance of the lens system. Since the changes of the focal distance of the lens system directly mean corresponding changes of the angle of view of the lens system, i.e., the magnification factor of the television image, with the above systems this magnification factor is always oscillating. This oscillation of the magnification factor of the television image is hardly recognizable in case when the reduction factor is low and the zoom factor is high, in which case the depth of field of the lens system is small so that the hill of the focus voltage is sharp and the amplitude of the oscillation is small. However, in case when the reduction factor of the lens system is high and the zoom factor is low, the depth of field is large so that the hill of the focus voltage is very broad, the amplitude of the oscillation of the helicoid is so large as to cause changes of the magnification factor of the television image by several percent or more in correspondence to the oscillation of the helicoid position. In this case, very unstable picture reproduction results. Particularly, when the depth of the field is very large so that focus on the televised sceen is obtained with the helicoid in whatever position, the shape of the focus voltage hill is very broad to cause very large oscillations of the helicoid, so that the aforementioned drawback is extremely pronounced.

The second drawback is that the above systems consume high power, although this drawback is not so critical as the first-mentioned drawback. In the above systems the helicoid is always caused to rock back and forth about the position of focus, and a motor for driving the helicoid is always consuming power. This is a serious drawback in case of a video camera having problems in the power supply such as the portable video camera.

SUMMARY OF THE INVENTION

The primary object of the invention is to provide an automatic focusing system for a video camera, which eliminates the oscillation of the magnification factor of the television image accompanying the focusing operation, and also with which the power consumption accompanying the focusing operation is reduced.

According to the invention, the prevailing depth of field of the lens is calculated from the reduction factor and focal distance (zoom factor) of the lens, the number of focusing points that can cover a focal distance range from the closest proximity distance to the camera to an infinite distance and stop positions of the helicoid (hereinafter referred to as preset focusing positions) corresponding to the respective focusing points are calculated according to the calculated depth of field, a closed loop control system based upon the focus voltage is used only for finding out one of the preset focusing positions closest to a goal focusing position of the helicoid, and once an in-focus state is obtained the helicoid is held at the preset focusing position that is closest to the apex of a hill of the focus voltage curve.

BRIEF DESCRIPTION OF THE DRAWING

FIG. 4 shows graphs for illustrating the operation of main parts of the system according to the invention.

DESCRIPTION OF THE PREFERRED EMBODIMENTS

Figure 1:
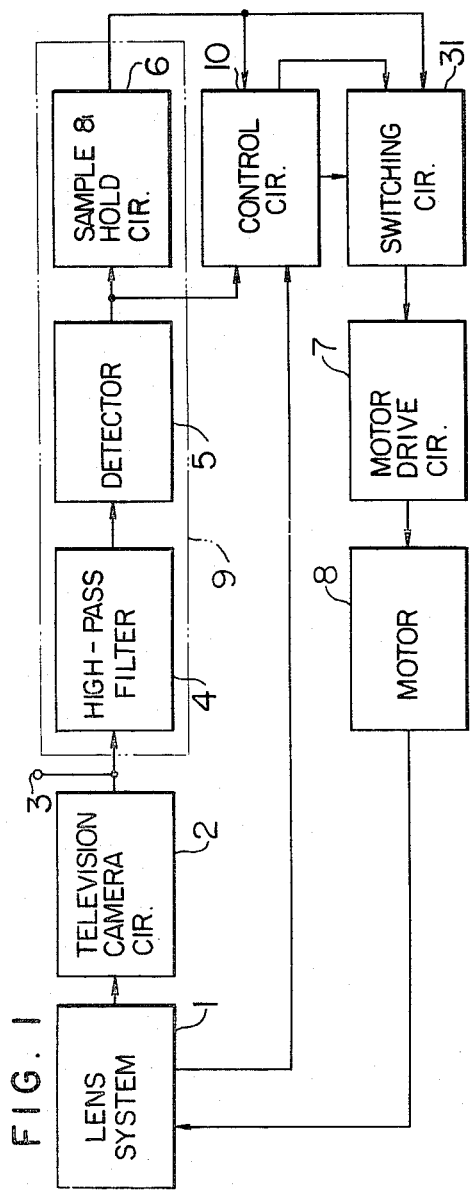
FIG. 1 is a block diagram outlying the construction according to the invention.
Figure 2:
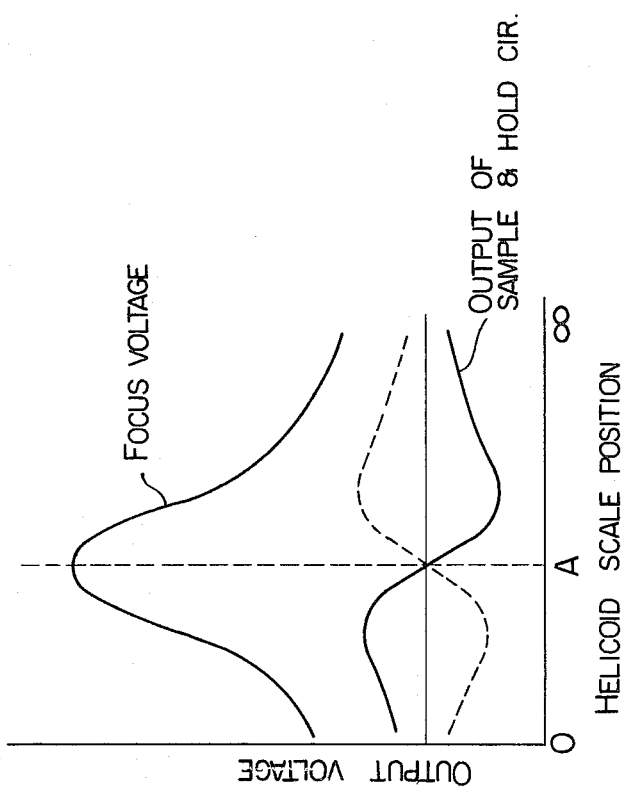
FIG. 2 is a graph showing the operational principles of part of the system according to the invention.

Referring now to FIG. 1, designated at 1 is a lens system of a television camera, and at 2 a television camera circuit including a video signal generator for converting a two-dimensional optical image formed by the lens system into a corresponding serial electric signal. The video signal is produced from the camera circuit and appears at an output terminal 3. It is also coupled through a high-pass filter 4 to obtain a high frequency component corresponding to the fineness of the image, and this high frequency component is detected in a detector 5 to obtain a focus voltage proportional to the magnitude of the high frequency component signal. The focus voltage is dependent upon the fineness of the television image, and it is maximum when the television image is in focus. As shown in FIG. 2, in case when the televised scene is at a distance A (in m) from the camera, the focus voltage is maximum when the helicoid is at a position of a graduation corresponding to A (in m) and is reduced as the helicoid departs from that position.

It will be understood from FIG. 2 that automatic focusing can be obtained through the control of the helicoid position such as to maintain the maximum focus voltage.

A sample and hold circuit 6 samples the focus voltage appearing from the detector 5 at a constant time interval and holds each sampled value, and also it produces a positive voltage when the focus voltage is increasing with the lapse of time and produces a negative voltage when the focus voltage is decreasing with the lapse of time. The high-pass filter 4, detector 5 and sample and hold circuit 6 constitute a focus voltage circuit 9. The output voltage of the sample and hold circuit 6 is coupled through a switching circuit 31 to a motor drive circuit 7. The motor drive circuit 7 functions such that when the input voltage to it is zero or positive, it continually causes the rotation of a motor 8 in the same direction as before for moving the helicoid in the corresponding direction, while when the input voltage becomes negative it reverses the direction of rotation of the motor 8 for moving the helicoid in the opposite direction.

While the sample hold circuit output voltage shown in FIG. 2 corresponds to the case of rotating the helicoid away from the position thereof corresponding to a focus point in the close proximity of the camera to a position corresponding to an infinitely remote focus point, it will be readily understood that the output voltage is as shown by a dashed curve in case when the helicoid is rotated from the infinitely remote focus point toward the close proximity focus point.

With the above arrangement, automatic focusing can be obtained as the helicoid position control circuit causes the helicoid to be driven by the motor 8 in a direction of climbing the hill of the focus voltage curve and eventually oscillate with a small amplitude about a position corresponding to the apex of the hill according to the output voltage of the sample and hold circuit 6. With this circuit construction alone, however, the afore-mentioned drawbacks are not eliminated.

The control circuit 10 calculates from signals representing the helicoid position, focal distance and reduction factor of the lens system 1 the number of preset focusing positions of the helicoid that cover a focus range from a focus point in the close proximity of the camera to an infinity remote focus point and the corresponding distance values of these preset focusing positions according to the prevailing value of the depth of field of the lens system, and memorizes the calculated data. It also detects from the output voltage of the sample hold circuit 6 the goal focusing position of the helicoid, reads out a preset focusing position closest to the goal focusing position, and switches the input terminal of the switching circuit 31 on the side of the sample and hold circuit 6 to that on the side of its own for producing a voltage corresponding to the difference between the actual helicoid position and the read-out focusing position. The helicoid in the lens system 1 is controlled through the motor drive circuit 7 and motor 8 such that the output voltage of the control circuit 10 is reduced to zero, and it is held at the read-out preset focusing position. The control circuit 10 has a further function of switching the input terminal of the switching circuit 31 on the side of the sample and hold circuit 6 to that on the side of its own when it detects from the focus voltage that the distance between the televized scene and camera is changed beyond the focus range or when the number of preset focusing positions is changed with a change of the focal distance or a change of the reduction factor due to a zoom action.

The afore-mentioned focusing positions will now be discussed. They are set such as to cover a focus range from a focus point in the close proximity to the camera to an infinitely remote focus point at the prevailing value of the depth of field of the lens system. The value of the i-th focusing position from that corresponding to the infinitely remote focus point is given as $$R_i = \frac{f^2}{\rho F} \cdot \frac{1}{(2i-1)} \quad (1)$$

where i is a positive integer, $\rho$ is the diameter of the permissible circle of confusion of the television image, f is the focal distance of the lens system 1, and F is the reduction factor of the lens system 1.

The inverse of the value $R_i$ of the i-th preset focusing position is, from equation (1), $$\frac{1}{R_i} = \frac{\rho F}{f^2}(2i-1),$$

and it will thus be seen that the preset focusing positions can be set at a uniform interval. The inverse of the value of the focusing position corresponding to the limit focus point that is thought as the infinitely remote focus point is $$(1)/(R_1) = (\rho F)/(f^2).$$

This means that when the focus is set to a point at the distance of $1/R_1$ (in m$^{-1}$), the image of a scene at an infinite distance, i.e., at a distance ranging from 0 to $2\rho F/f^2$ (in m$^{-1}$) is in focus. Thus, it is possible to have an image of a scene at a distance within a range from the infinite distance to the closest proximity distance in focus by setting the number N of the focusing positions to be $$N \geq \left(\frac{1}{R_{min}}\right) \div \left(\frac{2\rho F}{f^2}\right)$$

where $R_{min}$ (in m) is the closest proximity distance of the scene capable of televization. In other words, the number N of the preset focusing positions may be $$N \geq (\tfrac{1}{2}) \cdot (f^2/\rho F) \cdot (1/R_{min}) \quad (2)$$

For example, when a lens system with a focal distance of f=50 mm, a reduction factor of F=1.8 and a closest proximity distance of $R_{min}$=1 m is used as the lens system 1 and the diameter of the permissible circle of confusion is $\rho$=40 μm, the number N of the preset focusing positions is 18 as calculated from equation (2), and the values $R_i$ of the preset focusing positions are $R_1$=34.72 m, $R_2$=11.57 m, $R_3$=6.94 m, ..., $R_{18}$=0.99 m. In this case, with whatever distance of the scene a television image in a predetermined focus can be obtained by selecting the best one of the preset focusing positions $R_1$ to $R_{18}$, to which the helicoid is controlled.

Figure 3:
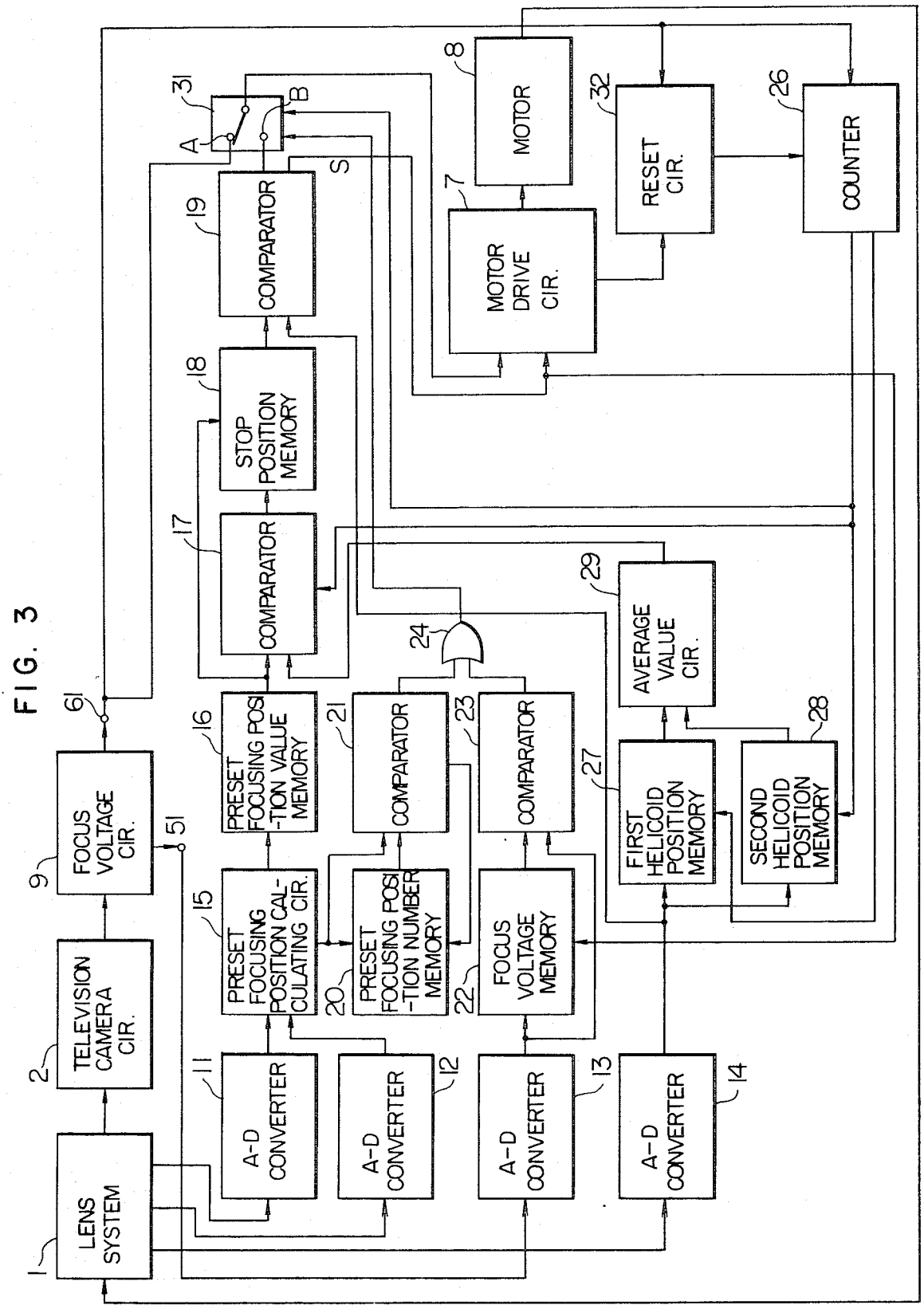
FIG. 3 is a block diagram showing the detailed circuit construction of an example of the control circuit shown in FIG. 1.

FIG. 3 shows a construction, which is used for finding out the best preset focusing position in the afore-mentioned prior art closed loop system based upon the focus voltage. The operation of this construction will now be described. The reduction factor F and focal distance f of the lens system 1 are digitally converted by respective analog-to-digital (A/D) converters 11 and 12 into respective digital signals, which are coupled to a preset focusing position calculating circuit 15. In the circuit 15 the number N of the preset focusing positions and the values $R_1$ to $R_N$ thereof are calculated on the basis of equations (1) and (2). The data about the number N of the preset focusing positions thus calculated is coupled to and memorized in a preset focusing position number memory 20, while the data about the calculated values of the individual preset focusing positions are coupled to and memorized in a preset focusing position value memory 16.

The operation of the construction of FIG. 3 consists of three stages, namely a first stage of determining a preset focusing position, at which the helicoid of the lens system 1 is to be held, a second stage of bringing the helicoid to and holding it at the preset focusing position determined in the first stage, and a third stage of checking if it is necessary to make the focusing operation afresh and start the focusing operation again if it is necessary to do so.

The first stage will now be described.

This stage consists of two sub-stages. In the first sub-stage, the number of preset focusing positions and the values thereof are calculated from the focal distance f and reduction factor F of the lens system 1 using equations (1) and (2), and the resultant data are memorized.

In the second sub-stage, the goal focusing position of the helicoid is determined by substantially the same closed loop system based upon the focus voltage as the prior art system, and then a preset focusing position closest to the goal focusing position is found out.

In the first sub-stage, the focal distance f and reduction factor F of the lens system 1 are converted through the respective A/D converters 11 and 12 to digital values, which are coupled to the preset focusing position calculating circuit 15. In the circuit 15, the number N of the preset focusing positions and the values $R_1$ to $R_N$ thereof are calculated using equations (1) and (2), and the resultant data are memorized in the preset focusing position number memory 20 and preset focusing position value memory 16 respectively.

In the second sub-stage, substantially the same focusing operation as in the prior art closed loop control system is made when a switching circuit 31 is in its state of connection to A side, but after the completion of two or three rotations of the motor 8 the switch circuit 31 is switched to B side to open the closed loop control system in order that the helicoid will not be continually oscillated after it is brought to the focusing position.

This operation will now be explained with reference to FIG. 4. In the Figure, a hill of the focus voltage is shown in (a). Designated at $h_1$ is the position of start of movement of the helicoid, and at $h_2$ a new focusing position thereof. This situation results, for instance, when a televized scene, which has initially been at a position $h_1$, is moved to position $h_2$. In case when the helicoid starts to be moved by the motor 8 in the climbing direction as shown in FIG. (b) in FIG. 4, at the time of the climbing focusing operation, it reaches the focusing position $h_2$ once and is then reversed at a position $h_3$ with the inversion of the output signal from the output terminal 61 of the sample and hold circuit 6. Then, it passes the focusing position $h_2$ again and is then reversed again at a position $h_4$. If the climbing focusing loop is continually held in the closed state, the helicoid infinitely continues to oscillate between the positions $h_3$ and $h_4$ as in the prior art. The fact that the helicoid has reached the focusing position can be known by detecting the second reversal of the helicoid. Thus, in the construction of FIG. 3 only the instant of inversion of the output signal at the terminal 61 from positive to negative is detected by a counter 26. At the time of the first reversal of the helicoid, the position $h_3$ thereof is memorized in a first helicoid position memory 27. At the time of the second reversal of the helicoid, the position $h_4$ is memorized in a second helicoid position memory 28, while at the same time the switching circuit 31 is switched to B side to open the climbing focusing loop.

In case when the helicoid starts to be moved by the motor 8 in the direction of ascending the hill as shown in (c) in FIG. 4, it has to be reversed once so that its orbit overlaps that shown in (b) in FIG. 4 before it reaches the focusing position, after starting from its position $h_1$ it has to be reversed at a position $h_5$ to proceed toward the position $h_2$. At the time of the reversal at the position $h_1$ the output signal form the terminal 61 is inverted from negative to positive, so that the reversal at this time is not detected by the counter 26. Subsequently, the counter 26 detects the second reversal at the position $h_3$ and the third reversal at the position $h_4$ similar to the case shown in (b) in FIG. 4. At the time of the start of driving of the motor 8 a reset circuit 32 resets the counter 26 according to a signal from the motor drive circuit 7, while at the same time stopping the counting operation of the counter to prevent malfunction in the initial stage of the driving.

When the content of the counter 26 reaches "2" so that the climbing focusing loop is opened, the comparing operation of the comparator circuit 17 is started, and the content of the memory 16 is successively coupled to the comparator circuit 17 and compared the output data of an average value circuit 29, which takes the average of the contents of the first and second helicoid position memories 27 and 28, whereby a preset focusing position closest to the average value is memorized in a stop position memory 18.

A comparator circuit 19 compares the preset focusing position data memorized in the memory 18 and a digital value obtained from an A/D converter, which converts a signal representing the prevailing position of the helicoid in the lens system 1 into the digital signal, and produces a positive or negative signal depending upon the difference between its two inputs. This output signal is coupled through the B side of the switching circuit 31 and motor drive circuit 7 to the motor 8, so that the helicoid in the lens system 1 is moved toward the preset focusing position memorized in the memory 18. When the output signal of the circuit 19 is reduced to zero, that is, when the detected helicoid position comes into coincidence with the preset focusing position memorized in the memory 18, the comparator circuit 19 supplies a stop signal S to the motor drive circuit 7 to stop the motor, while at the same time the prevailing focus voltage at the terminal 51 is converted by an A/D converter 13 into a digital value which is memorized in a focus voltage memory 22.

In the third stage of the operation, whether or not it is necessary to make the focusing operation afresh is checked, and the focusing operation is caused again when the distance between the televized scene and camera is changed or when the reduction factor F or focal distance f of the lens system 1 is changed. When only the reduction factor F or focal distance f of the lens system 1 is changed, the preset focusing position calculating circuit 15 calculates the number of preset focusing positions afresh, and the calculated data are coupled to a comparator circuit 21. The comparator circuit 21 compares the new preset focusing position number data with the content of the memory 20. If the two input data are identical, no focusing operation is caused afresh. If the two are different from each other, the comparator circuit 21 delivers a signal which is coupled through an OR circuit 24 to the switching circuit 31 to switch the circuit 31 to the A side for causing the focusing operation afresh. Also, after a predetermined delay time the preset focusing position number data from the circuit 15 is memorized in the memory 20, and the focusing operation is started from the first stage.

When the distance between the televized scene and camera is changed, the focus voltage provided from the A/D converter 13 and the output voltage of the memory 22, these voltages being coupled to the comparator circuit 23, become different from each other. Thus, the comparator circuit 23 produces a signal coupled through the OR circuit 24 to the switching circuit 31 to switch the circuit 31 to the A side for causing the focusing operation to be effected afresh from the first stage.

In either of the above cases, once the driving of the motor 8 is started the helicoid is moved from its initial position to the new focusing position through the same course as described earlier in connection with FIG. 4.

Further details of the circuit shown in FIG. 3 are not described since this circuit can be readily realized by using digital circuit techniques and can also be realized by a microcomputer program.

When the closest proximity or infinity graduation position is reached by the helicoid, the motor 9 is reversed without any condition for continuing the focusing operation.

As has been described in detail in the foregoing in connection with FIGS. 3 and 4, with the automatic focusing system according to the invention once the in-focus state is obtained the helicoid is completely stopped and held stationary until it becomes necessary to make the focusing operation again due to a change of the reduction factor or focal distance of the lens system or movement of the televized scene or camera, so that it is possible to obtain excellent picture reproduction free from the oscillations of the angle of view that may be caused with oscillations of the helicoid controlled by the prior art closed loop control system. Also, the motor need not always be rotated, so that the power consumption can be widely reduced.

While it has been described that the focusing operation is effected again immediately when the memorized focus voltage and prevailing focus voltage become different from each other in case when the distance between the televized scene and camera is changed after the previous focusing operation, experiments have proved that it is preferable to cause the focusing operation afresh after a difference of 10 to 20% is produced between the two voltages.

Further, while in the above embodiment the number of preset focusing positions is made to be the least number required for covering the whole depth of field and also the preset focusing positions are set at a uniform interval, according to the invention it is possible to provide any number of preset focusing positions greater than the least number, and these preset focusing positions may be arranged in any desired spacing so long as the depth of field covered by each preset focusing positions overlap that covered by the adjacent one.

Further, in case when the preset focusing position number calculated by the preset focusing position calculating circuit 15 shown in FIG. 3 is "1", i.e., when the focal distance of the lens system 1 is small or when the televized scene is very bright, the reduction factor F may be very large. In such a case, the focus voltage characteristic shown in FIG. 2 is very broad, and with the prior art closed loop control system the amplitude of the oscillation of the helicoid is very large, so that the afore-mentioned drawbacks due to the oscillation are extremely pronounced. According to the invention, the helicoid is fixed to the single focusing position in such a case, so that satisfactory results are obtainable.

We claim:

1. An automatic focusing system for a video camera comprising:
   (a) a circuit for detecting a focus voltage depending upon a high frequency component in a video signal of a televized scene;
   (b) a motor for driving a focusing lens provided in a lens system;
   (c) a first closed loop for effecting automatic focusing by driving said motor in the same direction as before when said focus voltage is increasing and reversing the direction of rotation of said motor when said focus voltage turns to decrease;
   (d) a second closed loop for positioning said lens through the driving of said motor such that the difference between a lens stop position signal memorized in a first memory and a signal representing the actual position of said lens is reduced to zero;
   (e) a first means for calculating a finite number of stop positions of said lens through division of a required focus distance range on the basis of the reduction factor and focal distance of said lens system and according to the depth of field thereof such as to permit televization of a scene in a permissible focus state over said required focus distance range and memorizing said stop positions in a second memory; and
   (f) a second means for permitting, when an in-focus state is brought about in the operation of said first closed loop, one of said stop positions closest to the prevailing position of said lens memorized in said second memory to be read out therefrom and written in said first memory while at the same time rendering said first closed loop into an open state and said second closed loop into a closed state.

2. An automatic focusing system for a video camera comprising:
   (a) a circuit for detecting a focus voltage depending upon a high frequency component in a video signal of a televised scene;
   (b) a motor for driving a focusing lens provided in a lens system;
   (c) a first closed loop for effecting automatic focusing by driving said motor in the same direction as before when said focus voltage is increasing and reversing the direction of rotation of said motor when said focus voltage turns to decrease;
   (d) a second closed loop for positioning said lens through the driving of said motor such that the difference between a lens stop position signal memorized in a first memory and a signal representing the actual position of said lens is reduced to zero;
   (e) a first means for calculating a finite number of stop positions of said lens through division of a required focus distance range of the basis of the reduction factor and focal distance of said lens system and according to the depth of field thereof such as to permit televization of a scene in a permissible focus state over said required focal distance range and memorizing said stop positions in a second memory;

(f) a second means for permitting, when an infocus state is brought about in the operation of said first closed loop, one of said stop positions closest to the prevailing position of said lens memorized in said second memory to be read out therefrom and written in said first memory while at the same time rendering said first closed loop into an open state and said second closed loop into a closed state and permitting the prevailing focus voltage to be memorized in a third memory; and (g) a third means for rendering said second closed loop into an open state and said first closed loop into closed state when said memorized focus voltage memorized in said third memory and the focus voltage from said detecting circuit become different from each other and/or when the number of stop positions memorized in said second memory and the number of stop positions calculated by said first means become different from each other.

3. An automatic focusing system for a video camera according to claim 1 or 2, wherein said second means calculates the average value between the value of a first position of said lens at the time of a first reversal of said motor after the reaching of a peak value of said focus voltage for the first time during the focusing operation of said first closed loop and a second position of said lens at the time of the second reversal of said motor after the reaching of said peak value of said focus voltage for the second time and permitting one of said stop positions memorized in said second memory to be read out therefrom and memorized in said first memory.

4. An automatic focusing system for a video camera according to claim 3, which further comprises a counter means for detecting the instants of said first and second reversals of said motor, said first position being memorized in a fourth memory when said first reversal instant is detected by said counter, said second position being memorized in a fifth memory when said second reversal instant is detected by said counter, said first closed loop being rendered into the open state and said second closed loop into the operative state when said second reversal instant is detected, said average value being derived from the contents of said fourth and fifth memories.

5. An automatic focusing system for a video camera according to claim 4, wherein said counter is reset to the initial state at the instant of the start of movement of said motor after said first closed loop is rendered into the closed state again.

* * * * *